(12) United States Patent
Alessi et al.

(10) Patent No.: US 12,468,791 B2
(45) Date of Patent: Nov. 11, 2025

(54) RECOGNITION OF UNAUTHORIZED ACCESS OF A PORTABLE ELECTRONIC APPARATUS

(71) Applicant: STMicroelectronics S.r.l., Agrate Brianza (IT)

(72) Inventors: Enrico Rosario Alessi, Catania (IT); Simone Ferri, Pogliano Milanese (IT); Fabio Passaniti, Syracuse (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 317 days.

(21) Appl. No.: 17/646,981

(22) Filed: Jan. 4, 2022

(65) Prior Publication Data

US 2022/0229887 A1 Jul. 21, 2022

(30) Foreign Application Priority Data

Jan. 18, 2021 (IT) .................. 102021000000752

(51) Int. Cl.
*G06F 21/31* (2013.01)
*G01P 13/00* (2006.01)
(Continued)

(52) U.S. Cl.
CPC ............ *G06F 21/316* (2013.01); *G01P 13/00* (2013.01); *G06F 3/0416* (2013.01); *H04R 1/08* (2013.01); *G06F 2203/04105* (2013.01)

(58) Field of Classification Search
CPC ................... G06F 21/316; G06F 2203/04105
See application file for complete search history.

(56) References Cited

U.S. PATENT DOCUMENTS

| 11,133,929 B1* | 9/2021 | Shahidzadeh ......... H04L 9/0891 |
| 2013/0191908 A1* | 7/2013 | Klein .................. H04W 12/069 726/18 |

(Continued)

FOREIGN PATENT DOCUMENTS

WO 2020178208 A1 9/2020

OTHER PUBLICATIONS

Anjomshoa, Fazel et al., "Mobile Behaviometric Framework for Sociability Assessment and Identification of Smartphone Users," 2016 IEEE Symposium on Computers and Communication (ISCC). IEEE, 2016, 6 pages.

(Continued)

*Primary Examiner* — Nicholas P Celani
(74) *Attorney, Agent, or Firm* — Slater Matsil, LLP

(57) ABSTRACT

To recognize an authorized user from an unauthorized user of a portable electronic apparatus, the portable electronic apparatus has a plurality of sensors and a user-recognition circuit. The sensors are each configured to generate a signal representative of a respective physical quantity associated with the use, by a user, of the portable electronic apparatus in an operating state. The user-recognition circuit is configured to receive a plurality of electrical signals from the plurality of sensors; determine a plurality of recognition parameters, each associated with a specific mode of use of the portable electronic apparatus by the user; determine a plurality of indicators of use, one for each recognition parameter, wherein each parameter indicates the probability that, at a time instant, the respective recognition parameter is associable with an unauthorized user; determine a probability of intrusion from the plurality of indicators of use; and compare the probability of intrusion with an intrusion threshold.

20 Claims, 5 Drawing Sheets

(51) Int. Cl.
  *G06F 3/041* (2006.01)
  *H04R 1/08* (2006.01)

(56) References Cited

U.S. PATENT DOCUMENTS

| | | | | |
|---|---|---|---|---|
| 2014/0232516 | A1* | 8/2014 | Stivoric | G16H 40/67 |
| | | | | 340/3.1 |
| 2014/0282877 | A1* | 9/2014 | Mahaffey | H04W 12/33 |
| | | | | 726/3 |
| 2014/0300554 | A1* | 10/2014 | Samuel | H04W 12/068 |
| | | | | 345/173 |
| 2015/0371023 | A1* | 12/2015 | Chen | G06F 21/316 |
| | | | | 726/17 |
| 2016/0036996 | A1 | 2/2016 | Midholt et al. | |
| 2017/0227995 | A1 | 8/2017 | Lee et al. | |
| 2018/0322271 | A1 | 11/2018 | Arora et al. | |
| 2021/0250342 | A1* | 8/2021 | Budman | G06F 21/316 |

OTHER PUBLICATIONS

Yu, Ke et al., "Positive and Unlabeled Learning for User Behavior Analysis Based on Mobile Internet Traffic Data," IEEE Access, Special Section on Human-Centered Smart Systems and Technologies, Jul. 2, 2018, 13 pages.

\* cited by examiner

RECOGNITION OF UNAUTHORIZED ACCESS OF A PORTABLE ELECTRONIC APPARATUS

CROSS-REFERENCE TO RELATED APPLICATIONS

This application claims priority to Italian Application No. 102021000000752, filed on Jan. 18, 2021, which application is hereby incorporated herein by reference.

TECHNICAL FIELD

The present invention relates to a method of recognition of an unauthorized access of a portable electronic apparatus.

BACKGROUND

As is known, electronic apparatuses, in particular portable electronic apparatuses such as mobile phones and wearable devices, are typically provided with mechanisms of protection capable of preventing any undesired or unauthorized access, for example by an unauthorized user. For instance, generally, access to the electronic apparatus may be protected by a secret identifier, which is known only to an authorized user, such as a password, a secret code, a pattern, or by a method of biometric identification, for example based upon fingerprints, voice recognition, and/or face recognition of the authorized user.

However, the secret identifier may get stolen or forcefully extorted by the unauthorized user to the detriment of the authorized user.

Moreover, the fingerprints, voice, and images of the authorized user may be forged by the unauthorized user in order to be able to gain access to the electronic apparatus.

Electronic apparatuses are moreover known, configured to store and analyse data regarding the way in which the authorized user uses the Internet traffic and/or specific applications connected to the Internet, for example social networks, so as to detect possible different or discordant modes of use that could indicate that an unauthorized user has taken over control of the electronic apparatus; for example, the apparatus has been stolen. However, this method has a low accuracy in preventing any undesired access to the electronic apparatus and requires the electronic apparatus to be connected to the Internet. Consequently, this method has a limited applicability, and the level of safety provided is not sufficiently high in specific applications.

The aim of the present application is to overcome the drawbacks of the known art.

SUMMARY

An embodiment includes a method of recognition of an authorized user from an unauthorized user of a portable electronic apparatus, where the portable electronic apparatus includes a plurality of sensors and a user-recognition circuit. The method includes receiving, at the user-recognition circuit, a plurality of electrical signals from the plurality of sensors in the portable electronic apparatus, where each of the plurality of sensors is configured to generate a signal representative of a respective physical quantity associated with the use, by a user, of the portable electronic apparatus in an operating state. The method includes determining, at the user-recognition circuit, a plurality of recognition parameters from the plurality of electrical signals, where each recognition parameter is associated with a specific mode of use of the portable electronic apparatus by the user. The method includes determining a plurality of indicators of use at the user-recognition circuit, one of the indicators being determined for each of the recognition parameters, where each of the indicators of use indicate the probability that, at a time instant, the respective recognition parameter is associable with an unauthorized user; determining, at the user-recognition circuit, a probability of intrusion starting from the plurality of indicators of use; and comparing, at the user-recognition circuit, the probability of intrusion with an intrusion threshold and based thereon recognizing the authorized user from an unauthorized user.

In an embodiment, a system includes a portable electronic apparatus comprising a plurality of sensors and a user-recognition circuit, the sensors being each configured to generate a signal representative of a respective physical quantity associated with the use, by a user, of the portable electronic apparatus in an operating state. The user-recognition circuit is configured to receive a plurality of electrical signals from the plurality of sensors in the portable electronic apparatus, where each of the plurality of sensors is configured to generate a signal representative of a respective physical quantity associated with the use, by a user, of the portable electronic apparatus in an operating state. The user-recognition circuit is configured to determine a plurality of recognition parameters from the plurality of electrical signals, each recognition parameter being associated with a specific mode of use of the portable electronic apparatus by the user; determine a plurality of indicators of use at the user-recognition circuit, one of the indicators being determined for each of the recognition parameters, where each of the indicators of use indicate the probability that, at a time instant, the respective recognition parameter is associable with an unauthorized user. The user-recognition circuit is configured to determine a probability of intrusion starting from the plurality of indicators of use; and compare the probability of intrusion with an intrusion threshold and based thereon recognize an authorized user from an unauthorized user of the portable electronic apparatus.

According to the present invention, a method of recognition of use of a portable electronic apparatus by an unauthorized user and a portable electronic apparatus are provided, as defined in the annexed claims.

BRIEF DESCRIPTION OF THE DRAWINGS

For a better understanding of the present invention, embodiments thereof are now described, purely by way of non-limiting example, with reference to the attached drawings, wherein.

DETAILED DESCRIPTION OF ILLUSTRATIVE EMBODIMENTS

Figure 1:
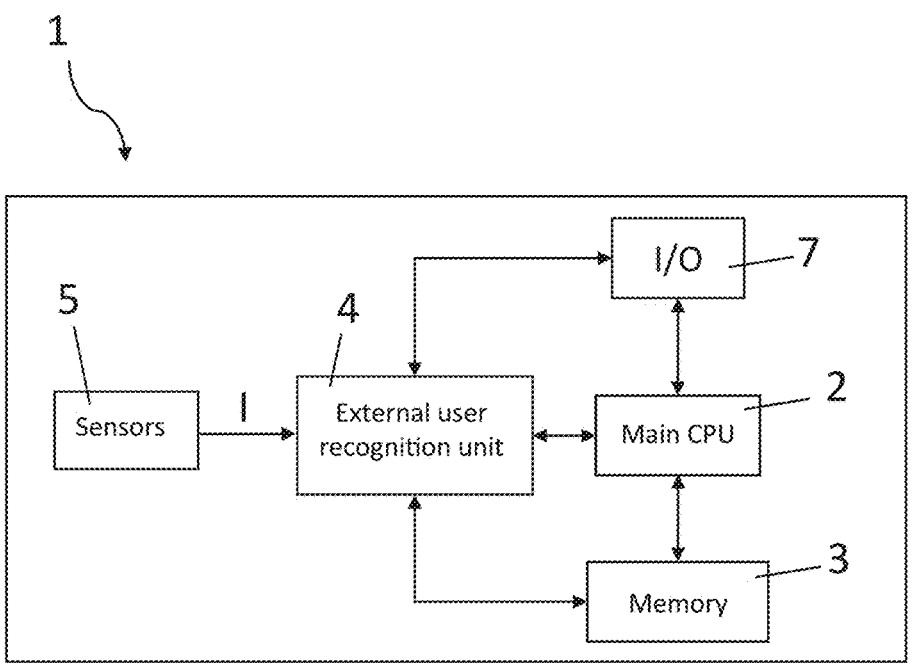
FIG. 1 shows a simplified block diagram of the present portable electronic apparatus.

FIG. 1 is a schematic illustration of a portable electronic apparatus 1, for example a mobile phone, a wearable device, such as a smartwatch or a pair of augmented-reality glasses, etc.

The portable electronic apparatus 1 is configured, when it is on, so as to be able to be in one of two different operating conditions, namely, an operating state, in which an external user can access the functions of the portable electronic apparatus 1 and the data stored therein, and a permanent block state, in which the external user is prevented from accessing the functions of the portable electronic apparatus 1 and the data stored therein.

As described in detail hereinafter, the portable electronic apparatus 1 is configured to be in the operating state if the external user is recognized as authorized user, for example an owner of the portable electronic apparatus 1, and in the permanent block state if the external user is recognized as unauthorized user. In particular, the portable electronic apparatus 1 is configured to verify, at pre-set instants or in pre-set situations, whether the current external user is authorized or not and, if the current external user is not authorized, to switch from the operating state to the permanent block state. The portable electronic apparatus 1 may moreover be configured so that, after being set into the permanent block state, following upon detection of an unauthorized user, it can no longer switch into the operating state, unless a reset operation is carried out by a special authorized user.

The portable electronic apparatus 1 comprises a main processing circuit 2, a main memory 3, an external user recognition circuit 4, a plurality of sensors 5, and a plurality of input and output interfaces 7, operatively coupled together.

For instance, the plurality of input and output interfaces 7 comprises one or more keys, a screen, for example a touchscreen, and/or one or more wireless connection cards.

Figure 2:
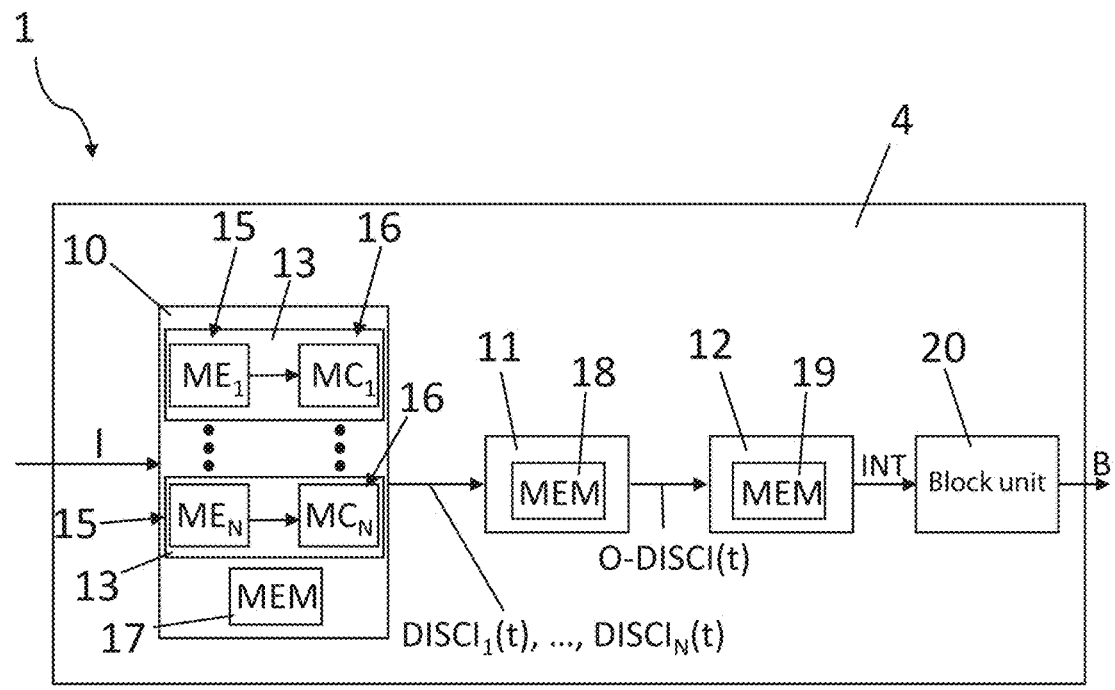
FIG. 2 shows a block diagram of the external user recognition circuit of the portable electronic apparatus of FIG. 1.

In detail, as illustrated in FIG. 2, the external user recognition circuit 4 comprises one or more processing circuits, here a first, a second, and a third processing circuit 10, 11, 12, which are operatively coupled together.

The sensors 5 are each configured to detect a respective physical quantity associated with use of the portable electronic apparatus 1, generate a set of electrical signals I and supply the set of electrical signals I to the external user recognition circuit 4, in particular to the first processing circuit 10.

The set of electrical signals I comprises, for each sensor of the plurality of sensors 5, one or more electrical signals as a function of the respective physical quantities detected.

In detail, and as described in detail hereinafter with reference to FIG. 6, the plurality of sensors 5 comprises movement sensors, for example accelerometers and gyroscopes, configured to detect quantities associated, for example, with acceleration, velocity, displacement, and angles of rotation of the portable electronic apparatus 1; acoustic sensors, configured to detect quantities associated with the sounds surrounding the portable electronic apparatus 1; pressure sensors, configured to detect quantities associated, for example, with intensity, duration, and frequency of touch of a screen or of a key of the electronic apparatus 1.

According to an embodiment, the plurality of sensors 5 also comprises at least one electrostatic-charge-variation sensor, as discussed in detail hereinafter with reference to FIG. 7. In particular, the electrostatic-charge-variation sensor is configured to detect a variation of electrostatic charge associated, for example, with the presence, movement, gestures, or other activities of an external user, who is in contact with, or in the proximity of, the portable electronic apparatus 1, or associated with touching of the portable electronic apparatus 1.

In addition, the plurality of sensors 5 may comprise one or more temperature sensors, humidity sensors, locating devices, for example of a GPS type, proximity sensors, one or more photographic cameras and video cameras, biometric sensors, for example for fingerprint detection, measurement of body temperature, body fat, breathing rate, blood pressure, heartbeat, etc.

The first, the second and the third processing circuits 10, 11, 12 each comprise a respective memory, respectively indicated by 17, 18 and 19, and are configured to determine a probability of intrusion of the portable electronic apparatus 1 by an unauthorized user, starting from the values of the set of electrical signals I, in particular using known machine learning algorithms.

The first processing circuit 10 further comprises a plurality of analysis circuits 13, functionally coupled to the memory 17 and configured to receive the set of electrical signals I and determine a plurality of indicators of use of the portable electronic apparatus 1, starting from the set of electrical signals I, as discussed in detail hereinafter.

Here, the analysis circuits 13 each comprise a respective parameter-extraction circuit 15 and a respective classification circuit 16.

Each analysis circuit 13, in particular each parameter-extraction circuit 15, is configured to receive in input a respective portion of the set of electrical signals I, starting from which to determine a respective set of signal-description parameters, indicative of a respective recognition parameter, which is associated with a specific way of use of the portable electronic apparatus 1 by the external user.

For instance, a recognition parameter may be the acoustic background noise, the way of movement, the way of touching the portable electronic apparatus 1, the surrounding environment, for example according to one or more quantities chosen among temperature, humidity, and light intensity, the number of stairs climbed per day, the number of steps made per day, the position of the cellphone during a call, the typical mode and timetable of battery charging, etc.

In detail, each set of signal-description parameters comprises the value of one or more statistical parameters, which are calculated starting from the respective portion of signals of the set of electrical signals I.

For instance, each parameter-extraction circuit 15 can determine, as set of signal-description parameters, the mean and/or variance of the respective portion of the set of electrical signals I, in a specific time window.

For instance, each parameter-extraction circuit 15 can determine, in a specific time window, as set of signal-description parameters, one or more among auto-correlation, number of zero-crossings, peak-to-peak value, number of peaks, number and position of local maxima and minima, inflection points, or a combination of the foregoing, starting from the respective portion of the set of electrical signals I, in particular starting, for example, from amplitude, mean, variance, frequency spectrum, derivative, or integral of the respective portion of the set of electrical signals I.

The classification circuits 16 are each configured to receive the respective set of signal-description parameters and determine the plurality of indicators of use.

In detail, the classification circuits 16 are each configured to classify the respective recognition parameter in a respective concordance class or in a respective discordance class by applying one or more known classification algorithms to the values of the respective set of signal-description parameters.

The concordance class of a recognition parameter is defined by the values of the respective set of signal-description parameters that are associated with a specific mode of use of the portable electronic apparatus 1 by the authorized user.

The discordance class of a recognition parameter is defined by the values of the respective set of signal-description parameters that are associated with a specific mode of use of the portable electronic apparatus 1 by the unauthorized user.

In order to carry out the classification, the classification circuits 16 each compare current values of the respective set of signal-description parameters with previous values of the respective set of signal-description parameters, using specific weights stored in the memory 17 of the first processing circuit 10.

The classification circuits 16 generate, at output, following upon classification, the plurality of indicators of use, referred to here and in what follows as plurality of specific discordance indicators $DISCI_1(t), \ldots, DISCI_N(t)$. Each specific discordance indicator $DISCI_i(t)$ indicates the current discordance probability $P_d(t)$ of the respective recognition parameter, i.e., the probability of the respective recognition parameter being classified, at a time instant t, in the respective discordance class.

The current discordance probability $P_d(t)$ of a recognition parameter can be calculated starting from the current concordance probability $P_c(t)$ of the same recognition parameter, i.e., from the probability of the recognition parameter being classified, at a time instant t, in the respective concordance class. In fact, the current discordance probability $P_d(t)$ of a recognition parameter is a function of the current concordance probability $P_c(t)$ of the same recognition parameter; in particular, $P_c(t)+P_d(t)=1$.

The one or more classification algorithms used by the classification circuits 16 may be of a supervised type, a non-supervised type, or a combination thereof. For instance, the one or more classification algorithms may include a clustering algorithm, a decision tree, a neural network, for example of a recurrent, recursive, deep, or convolutional type, a support-vector machine (SVM), a K-means algorithm, etc.

According to an embodiment, as discussed in detail hereinafter with reference to FIG. 5, the memory 17 of the first processing circuit 10 comprises training data, which are provided by the authorized user in a step of initialization of the portable electronic apparatus 1 and are used by the classification circuits 16 as examples of values (training values) of the signal-description parameters, and therefore of the respective recognition parameters, belonging to the respective concordance class.

The second processing circuit 11 is configured to receive at input the plurality of specific discordance indicators $DISCI_i(t), \ldots, DISCI_N(t)$ supplied at output by the classification circuits 16 and calculate an overall discordance indicator O-DISCI at the time instant t, which indicates the current probability of the portable electronic apparatus 1 being used, at the time instant t, by an unauthorized user.

The overall discordance indicator O-DISCI at the time instant t is supplied to the third processing circuit 12 and is stored in the respective memory 19. The third processing circuit 12 is configured to process the overall discordance indicators O-DISCI stored in the respective memory 19 in a decision interval $\Delta t$, and consequently determine whether the external user is recognized or not as authorized user, as described in detail hereinafter.

The external user recognition circuit 4 further comprises a block unit 20, configured to receive at input an intrusion signal INT, from the third processing circuit 12, in the case where the external user is recognized as unauthorized user, and supply at output a blocking signal B, which is configured to set the portable electronic apparatus 1 in the permanent block state.

Figure 3:
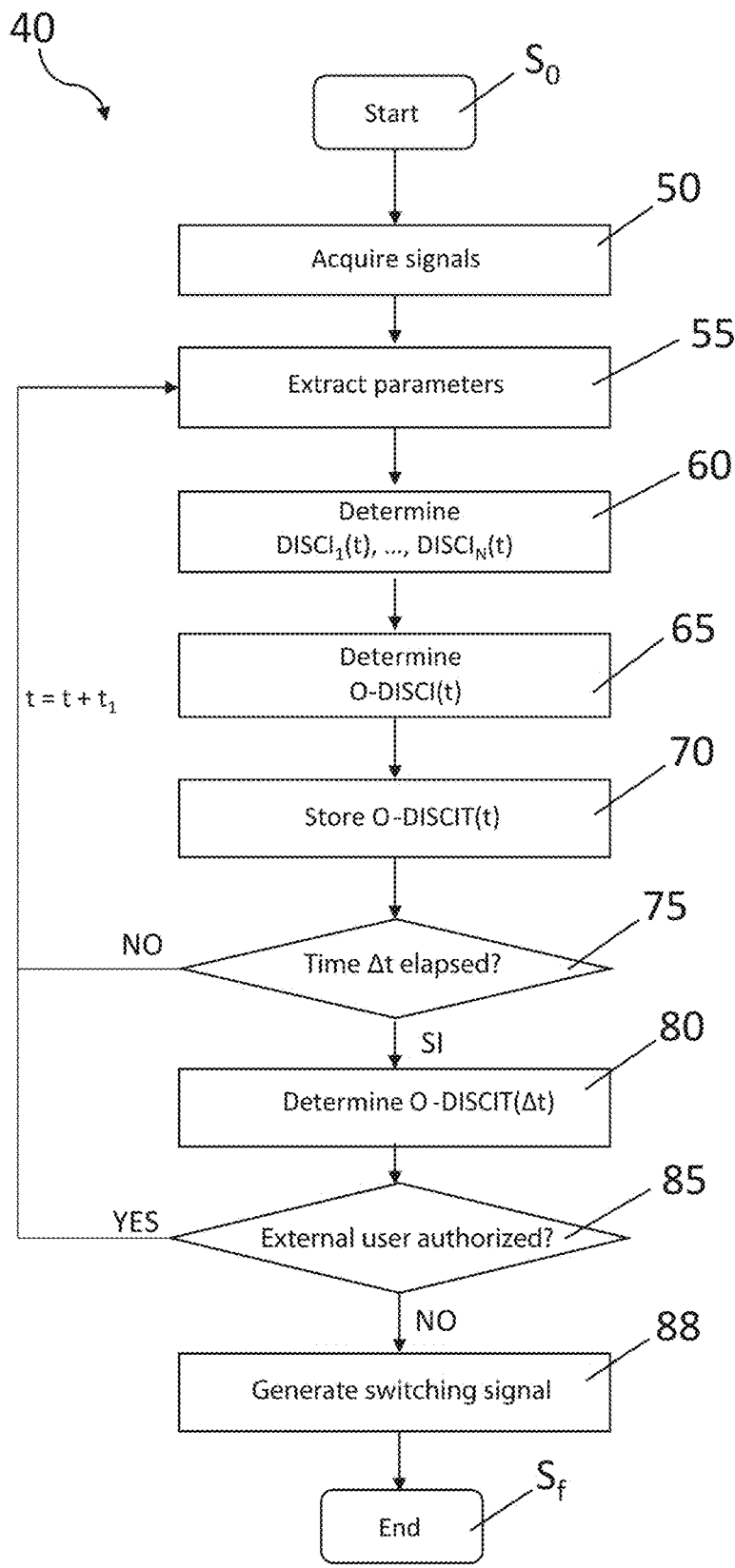
FIG. 3 shows a flowchart of the present method of recognition of use of the portable electronic apparatus of FIG. 1 by an unauthorized user.

The external user recognition circuit 4 is configured to execute the method illustrated in the flowchart of FIG. 3 and designated by the number 40.

The method 40 comprises an initial step $S_o$, wherein the portable electronic apparatus 1 passes, for example, from an OFF state to an ON state, entering the operating state.

During operation of the portable electronic apparatus 1, and therefore during its use by an external user, an acquisition step 50 follows, wherein the sensors 5 each acquire the respective physical quantities associated with use of the portable electronic apparatus 1 by the external user, generate the set of electrical signals I, and supply the set of electrical signals I to the first processing circuit 10, in particular to the parameter-extraction circuits 15 of the analysis circuits 13.

The sensors 5 may each be configured to acquire and supply, to the first processing circuit 10, the respective electrical signals in a continuous way, for example on the basis of the period of a respective clock.

Consequently, the analysis circuits 13 may be configured (step 55) to use a moving window each for processing a signal of the respective portion of electrical signals I. In this way, the input data used by the parameter-extraction circuits 15 are obtained at a time instant t. For instance, within each moving window, the analysis circuits 13 may be configured to execute operations such as averaging, integration, differentiation, etc.

Next, the parameter-extraction circuits 15 each process a respective portion of the input data, which is a function of the respective portion of the set of electrical signals I, each to extract the respective set of signal-description parameters, as discussed above.

The classification circuits 16 then each classify (step 60) the respective set of signal-description parameters, which indicates the respective recognition parameter, and supply at output the specific discordance indicators $DISCI_i(t), \ldots, DISCI_N(t)$, one for each recognition parameter, wherein, as discussed above, each specific discordance indicator $DISCI_i(t)$ indicates the probability of the respective recognition parameter, at the time instant t, to belong to the discordance class, i.e., that the respective recognition parameter indicates a specific use of the electronic apparatus 1, by the external user, that is associable with an unauthorized user.

The specific discordance indicators $DISCI_i(t), \ldots, DISCI_N(t)$ are then supplied to the second processing circuit 11.

The second processing circuit 11 (step 65) is configured to process the specific discordance indicators $DISCI_i(t), \ldots, DISCI_N(t)$ and supply at output a corresponding overall discordance indicator O-DISCI(t), which indicates the probability that, at the time instant t, the external user is associable with an unauthorized user.

According to an embodiment, in step 65, the second processing circuit 11 is configured to execute a weighted average of the specific discordance indicators $DISCI_i(t), \ldots, DISCI_N(t)$.

The weighted average is calculated by attributing a weight $w_i$ to each discordance indicator $DISCI_i(t)$. The weights w are stored in the portable electronic apparatus 1, for example in the memory 18 of the second processing circuit 11, and can be established during initialization or calibration of the portable electronic apparatus 1 and can be modified in time, following upon subsequent steps of calibration and/or training of the second processing circuit 11.

Figure 4:
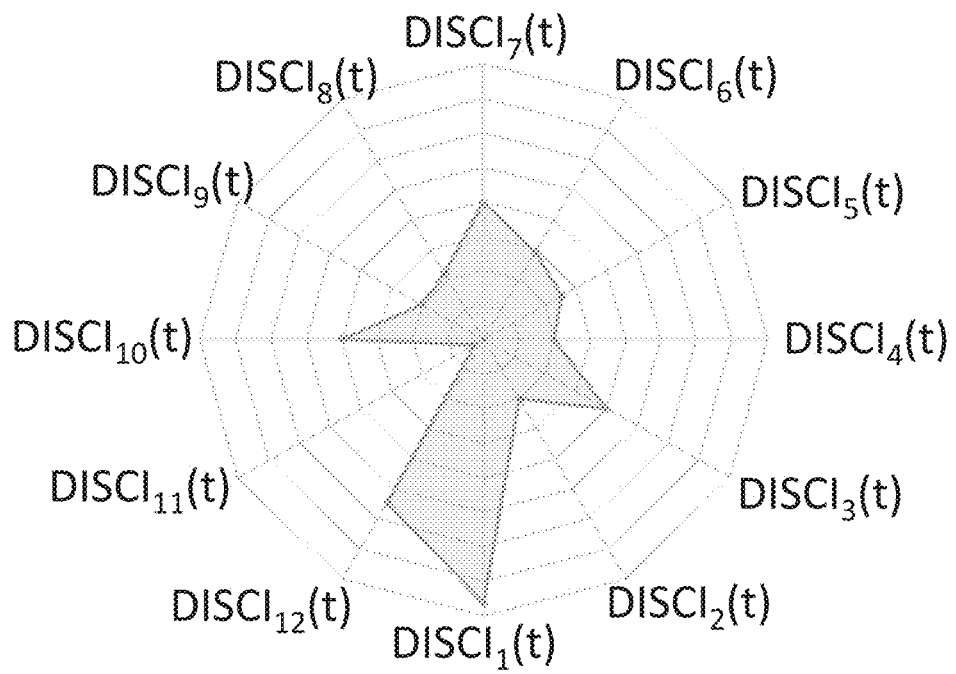
FIG. 4 shows a pattern generated by the specific discordance indicators that are calculated by the portable electronic apparatus of FIG. 1, applying the method of FIG. 3.

According to a different embodiment, in step 65, the second processing circuit 11 is configured to process the specific discordance indicators $DISCI_i(t), \ldots, DISCI_N(t)$, using a known machine-learning algorithm, in particular a pattern-recognition algorithm, for example an artificial neural network, to calculate the overall discordance indicator O-DISCI(t), whose weights $w_i$ are determined during a training step and stored in the memory 18 of the second processing circuit 11. The specific discordance indicators $DISCI_i(t), \ldots, DISCI_N(t)$ can be represented graphically as illustrated in FIG. 4 in the case of twelve specific discordance indicators $DISCI_i(t), \ldots, DISCI_{12}(t)$. In particular, the representation of the specific discordance indicators $DISCI_i(t), \ldots, DISCI_N(t)$ uses a plurality of axes, one for each recognition parameter, wherein the value of the respective specific discordance indicator $DISCI_i$ at the time instant t is indicated on each axis.

By connecting the value of a specific discordance indicator $DISCI_i(t)$ of an axis with the value of the specific discordance indicator $DISCI_j(t)$ of an adjacent axis, a pattern is formed (represented in light grey in FIG. 4).

The pattern-recognition algorithm is trained to calculate at output the overall discordance indicator O-DISCI(t), receiving at input the specific discordance indicators $DISCI_i(t), \ldots, DISCI_N(t)$ and using the weights $w_i$.

The overall discordance indicator O-DISCI(t) is then (step 70) supplied to and stored in the memory 19 of the third processing circuit 12 for subsequent processing.

The external user recognition circuit 4 verifies whether a decision interval $\Delta t$ has elapsed (step 75).

If the decision interval $\Delta t$ has not elapsed (output NO from step 75), the steps 55-65, wherein the specific discordance indicators $DISCI_1, \ldots, DISCI_N$ and the overall discordance indicator O-DISCI are calculated, are repeated at a time instant t+t' subsequent to the time instant t. Moreover, also step 70 is repeated, wherein the value of the overall discordance indicator O-DISCI at the time instant t+t' is stored in the memory 19 of the third processing circuit 12.

For instance, the time t' between two successive repetitions of the steps 55-70 may be fixed or variable, and may, for example, be of a few seconds, minutes, or hours, in particular one minute, according to the specific application.

When the decision interval $\Delta t$ has elapsed (output YES from step 75), the third processing circuit 12 processes (step 80) the values of the overall discordance indicators O-DISCI stored during the decision interval $\Delta t$ and supplies at output an overall discordance indicator over time O-DISCIT($\Delta t$).

The decision interval $\Delta t$ may have a fixed or variable duration, for example comprised between one day and thirty days. In other words, the overall discordance indicator over time O-DISCIT($\Delta t$) is calculated once a week or once every multiple weeks.

For instance, the overall discordance indicator over time O-DISCIT($\Delta t$) can be determined by making a weighted average of the overall discordance indicators O-DISCI(t) in the decision interval $\Delta t$.

Alternatively, the overall discordance indicator over time O-DISCIT($\Delta t$) can indicate the number of times in which, in the decision interval $\Delta t$, the overall discordance indicators O-DISCI(t) are higher than a threshold chosen during calibration or training of the third processing circuit 12.

Then (step 85), the third processing circuit 12 compares the overall discordance indicator over time O-DISCIT($\Delta t$) with an intrusion threshold, which is also chosen during calibration or training of the third processing circuit 12. Step 85 can be executed via a known machine-learning algorithm, for example using an artificial neural network.

If the third processing circuit 12 verifies that the overall discordance indicator over time O-DISCIT($\Delta t$) is lower than the intrusion threshold (branch YES at output from step 85), then steps 55-75 are repeated, and the third processing circuit 12 calculates a new value of the overall discordance indicator over time O-DISCIT($\Delta t$), using the values of the overall discordance indicators O-DISCI stored in the memory 19 of the third processing circuit 12.

If the third processing circuit 12 verifies that the overall discordance indicator over time O-DISCIT($\Delta t$) is higher than the intrusion threshold (branch NO at output from step 85), then the third processing circuit 12 supplies the intrusion signal INT to the block unit 20. Next (step 88), the block unit 20 generates and supplies at output the block signal B, for example to the main processing circuit 2, which is configured to set the portable electronic apparatus 1 in the permanent block state (end $S_f$).

In other words, step 88 indicates that, during the decision interval $\Delta t$, the external user who has used the portable electronic apparatus 1 corresponds to an unauthorized user; for example, the portable electronic apparatus 1 has been stolen. The permanent block state guarantees that the unauthorized user has no longer access to the functionalities of the portable electronic apparatus 1 and to the data stored therein.

According to an embodiment, the portable electronic apparatus 1 may be further configured so that a special authorized user, for example the manufacturer of the portable electronic apparatus 1, can restore the portable electronic apparatus 1 from the permanent block state to the operating state.

Figure 5:
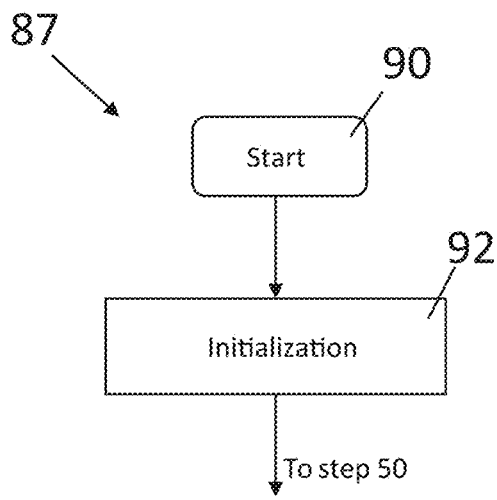
FIG. 5 shows a flowchart of a part of the present method of recognition of use of the portable electronic apparatus of FIG. 1, according to another embodiment.

According to this embodiment, as illustrated in FIG. 5, the method, designated by 87, also comprises an initialization step 92, executed before the steps of the method 40 of FIG. 3. In detail, the method 87 starts with a step 90, corresponding to a first start-up of the portable electronic apparatus 1. For instance, the first start-up corresponds to the first time when the authorized user starts the portable electronic apparatus 1.

A step of initialization 92 of the external user recognition circuit 4 of the portable electronic apparatus 1 follows, wherein the machine-learning algorithms used by the first processing circuit 10 are trained on the basis of information of use supplied directly by the authorized user. In detail, the information of use supplied by the authorized user is converted, by using known conversion factors stored in the portable electronic apparatus 1, for example in the memory 17 of the first processing circuit 10, into expected values of the set of electrical signals I, i.e., values of the recognition parameters belonging to the concordance class, thus corresponding to the use of the portable electronic apparatus 1 by the authorized user. Then, the method 87 proceeds with step 50 of the method 40 of FIG. 3.

The information of use can also be used for training the machine-learning algorithms used by the second processing circuit 11 and by the third processing circuit 12; thus, for example, to train the algorithm of recognition of the pattern formed by the specific discordance indicators $DISCI_1(t), \ldots, DISCI_N(t)$, or to determine the weights $w_i$ used in step 65, and to train the algorithm of determination of the overall discordance indicator over time $O\text{-}DISCI(\Delta t)$, or to determine the weights used in step 80 and the intrusion threshold used in step 85.

For instance, the information of use can be determined on the basis of questions, which are submitted to the authorized user for example via a graphic interface of the portable electronic apparatus 1, and which are indicative of the way in which the authorized user uses the portable electronic apparatus 1.

Therefore, the information of use allows to have positive-labelled examples linked to use of the portable electronic apparatus 1 by the authorized user and therefore allows to speed-up the step of training of the machine-learning algorithms used by the first, the second and the third processing circuits 10, 11, 12. This also allows to obtain a high level of accuracy in determining whether the external user corresponds to the authorized user, even though a limited time has elapsed since the first start-up of the portable electronic apparatus 1.

Figure 6:
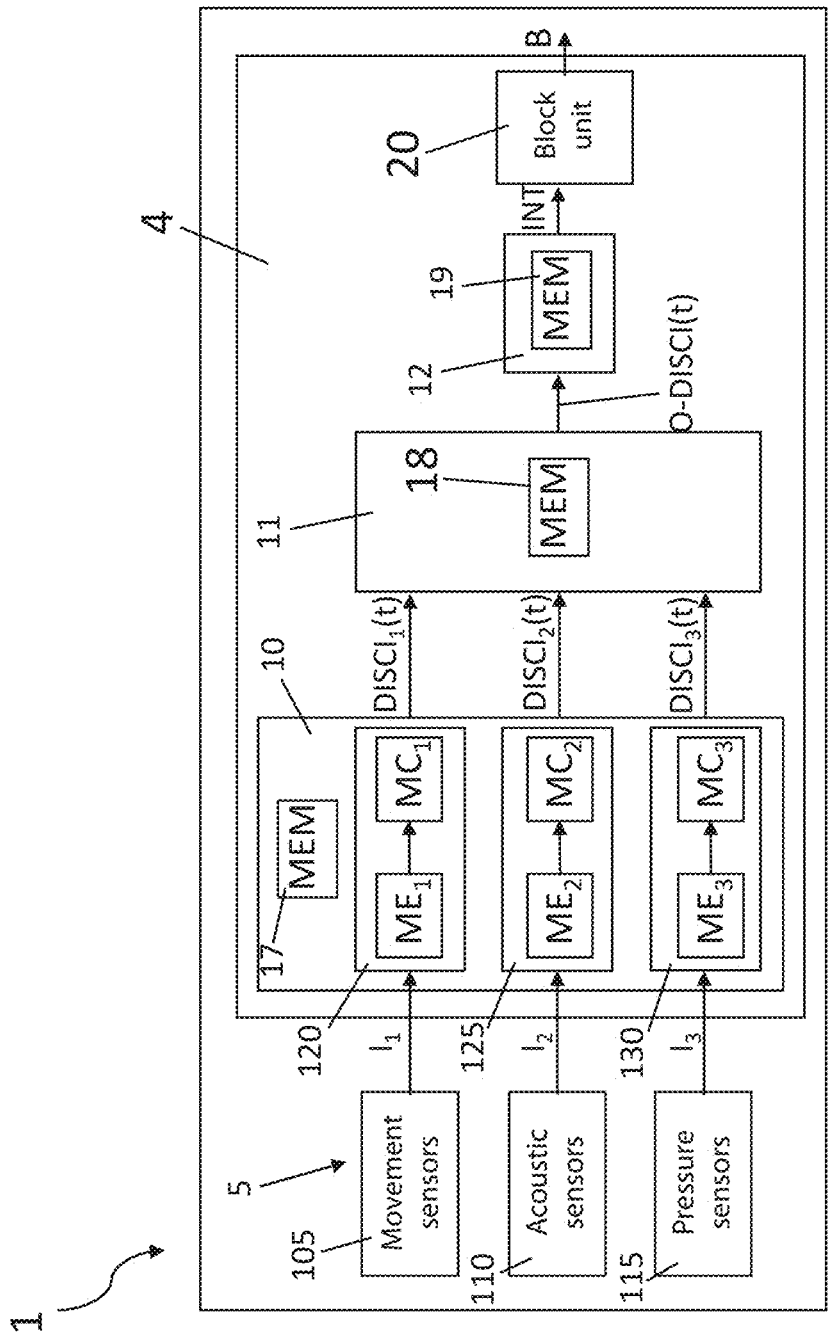
FIG. 6 shows a block diagram of a specific embodiment of the portable electronic apparatus of FIG. 1.

FIG. 6 shows another embodiment of the portable electronic apparatus 1 wherein the method 40 of FIG. 3 and the method 87 of FIG. 5 are executed using three specific discordance indicators, referred to as first specific discordance indicator $DISCI_1$, second specific discordance indicator $DISCI_2$, and third specific discordance indicator $DISCI_3$.

In detail, in FIG. 6, the plurality of sensors 5 comprises one or more movement sensors 105, for example one or more accelerometers, of a uni-axial, bi-axial, or tri-axial type and/or a gyroscope; one or more acoustic sensors 110, for example a microphone; and one or more pressure sensors 115, for example a force sensor for detecting touching of a screen or of a key of the portable electronic apparatus 1.

The set of electrical signals I therefore comprises a movement signal $I_1$, which is generated by the movement sensors 105 and comprises, for example, data regarding the acceleration and orientation of the portable electronic apparatus 1; an acoustic signal $I_2$, which is generated by the acoustic sensors 110 and comprises, for example, data regarding sounds external to the portable electronic apparatus 1; and a pressure signal $I_3$, which is generated by the pressure sensors 115 and comprises, for example, data regarding the force with which the screen or the key of the portable electronic apparatus 1 is touched.

Herein, the analysis circuits 13 comprise a movement-analysis circuit 120, a background-noise-analysis circuit 125 and a touch-analysis circuit 130, which are configured to receive at input, respectively, the movement signal $I_1$, the acoustic signal $I_2$, and the pressure signal $I_3$.

In detail, the movement-analysis circuit 120 comprises a respective parameter-extraction circuit $ME_1$ and a respective classification circuit $MC_1$, which are configured, as discussed above, to process, at the time instant t, the values of the movement signal I in a first previous acquisition interval; to extract the corresponding set of movement-signal-description parameters, indicating a movement-recognition parameter; and to supply at output the first specific discordance indicator $DISCI_1$, which represents the discordance of movement of the portable electronic apparatus 1, and therefore of the external user, with respect to the movement of the portable electronic apparatus 1 when used by the authorized user, as stored in the memory 17 of the first processing circuit 10. The values of the movement signal I comprise, for example, amplitude and phase of the acceleration and/or of the velocity along three axes of a cartesian reference system and/or of the angles of rotation of the portable electronic apparatus 1.

The background-noise-analysis circuit 125 comprises a respective parameter-extraction circuit $ME_2$ and a respective classification circuit $MC_2$, which are configured to process, at the time instant t, the values of the acoustic signal $I_2$ in a second previous acquisition interval; to extract the corresponding set of acoustic-signal-description parameters, indicative of a background-noise-recognition parameter; and to supply at output the second specific discordance indicator $DISCI_2$, which represents the discordance of the external background noise of the portable electronic apparatus 1, used by the external user, with respect to the external background noise when the portable electronic apparatus 1 is used by the authorized user, as stored in the memory 17 of the first processing circuit 10. The values of the acoustic signal $I_2$ comprise, for example, amplitude, phase, and frequency of the sounds detected by the acoustic sensors 110.

The touch-analysis circuit 130 comprises a respective parameter-extraction circuit $ME_3$ and a respective classification circuit $MC_3$, which are configured to process, at the time instant t, the values of the pressure signal $I_3$ in a third previous acquisition interval; to extract the corresponding set of pressure-signal-description parameters, indicating a touch-recognition parameter; and to supply at output the third specific discordance indicator $DISCI_3$, which represents the discordance of the way of touching the screen and/or the keys of the portable electronic apparatus 1 by the external user, with respect to the way of touching the screen and/or the keys of the portable electronic apparatus 1 when the latter is used by the authorized user, as stored in the memory 17 of the first processing circuit 10. The values of the pressure signal $I_3$ comprise, for example, amplitude and phase of the intensity of touch and duration of the touch detected by the pressure sensors 115.

In the case of the portable electronic apparatus 1 of FIG. 6, the information of use can be obtained via questions regarding, for example, the habits of displacement and the means of transport used by the authorized user, in order to extract the training values for the movement-analysis unit 120.

In addition, the authorized user can be asked to carry out movement tests, for example walking or running tests, in order to extract further training values of the movement-analysis circuit 120.

Moreover, the information of use can be obtained via questions regarding the places of habitual frequentation of the authorized user in order to extract the training values of the background-noise-analysis circuit 125.

Furthermore, for example, the authorized user can be asked to conduct pressure tests of the screen or of the keys of the electronic apparatus 1 in order to extract the training values of the touch-analysis circuit 130.

Figure 7:
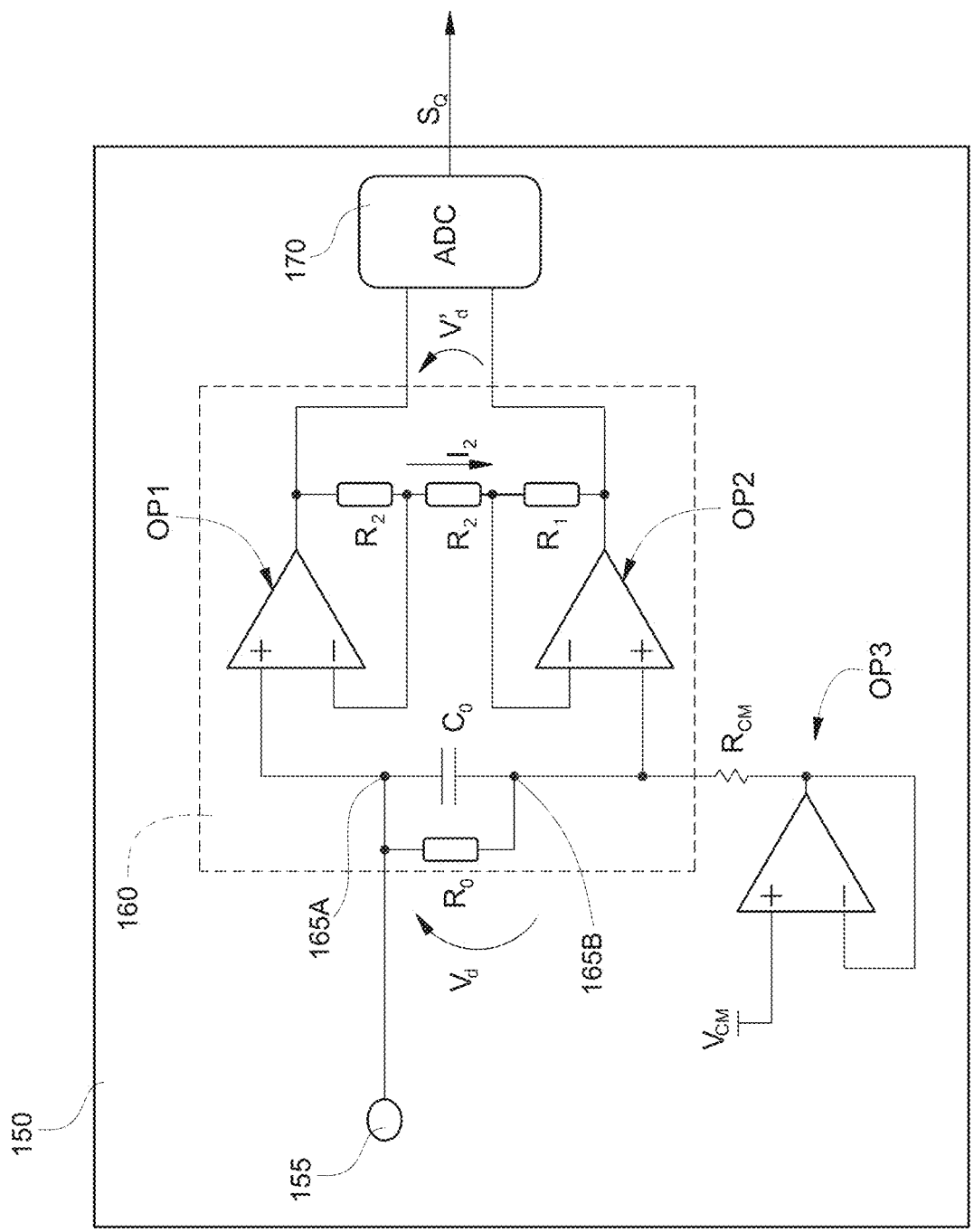
FIG. 7 shows a block diagram of an electrostatic-charge-variation sensor of a specific embodiment of the portable electronic apparatus of FIG. 1.

According to an embodiment, the plurality of sensors 5 of the portable electronic apparatus 1 comprises one or more electrostatic-charge-variation sensors 150, one of which is illustrated in FIG. 7.

The electrostatic-charge-variation sensor 150 comprises a sensitive element, or electrode, 155, with which a part of the body of an external user of the portable electronic apparatus 1, for example his hand or finger, can be set in electrical contact. For instance, the part of the body of the external user of the portable electronic apparatus 1 can be set in direct or indirect electrical connection with the electrode 155.

The electrode 155 may be integrated within the case of the portable electronic apparatus 1 or may be integrated in an external device, for example a smartwatch, connected to the portable electronic apparatus 1 by a cable or in wireless mode.

The electrode 155, which is configured to collect the external charge, may be a metal surface or an electrode coated with dielectric material or a metal surface set under the case of the device that integrates it.

For instance, it is possible to use a touchscreen of the portable electronic apparatus 1 as electrode for acquisition of the environmental electrostatic charge or the electrostatic charge deriving from touching by the external user.

The electrical or electrostatic charge is, for example, transferred from the external user to the sensitive element 155 during use of the portable electronic apparatus 1 when the external user rests his finger, or hand, or some other portion of his body, in direct or indirect electrical contact with the sensitive element 155.

The electrostatic-charge-variation sensor 150 is sensitive to the variation of electrostatic charge caused by the movements of the external user.

Each movement of the external user generates in fact a variation of electrostatic charge through the body of the external user himself, which is due to an exchange of charges with the ground/floor or the surrounding environment and is detected by the electrostatic-charge-variation sensor 150, in particular by the electrode 155.

For instance, the variation of electrostatic charge can be generated by a step taken by the external user, for example caused by raising or lowering his foot or leg, or by a gesture, for example, made by his hand.

For instance, the variation of electrostatic charge may be generated by the way of touching the portable electronic apparatus 1 by the external user, for example according to the duration and force of touch.

A signal associated with the variation of electrostatic charge deriving from specific movements can be isolated and identified, by the first processing circuit 10, with respect to other movements not of interest and with respect to the background noise present in the case of inactivity of the external user.

In this embodiment, as illustrated in FIG. 7, the electrostatic-charge-variation sensor 150 also comprises an instrumentation amplifier 160, which has a first input 165A, electrically coupled to the electrode 155, and a second input 165B, which is electrically coupled to the first input 165A by a resistor $R_o$ and a capacitor $C_o$ in parallel with one another. The resistor $R_o$ and the capacitor $C_o$ have the function of accumulating the charges collected by the electrode 155 and managing the bandwidth of the input signal (for filtering signals and noise of undesired frequency).

An input voltage $V_d$, associated with the variation of electrostatic charge and therefore to the use of the portable electronic apparatus 1 by the external user, is thus generated between the first input 165A and the second input 165B.

The values of capacitance of the capacitor $C_o$ and of resistance of the resistor $R_o$ can be chosen according to the type of filter that it is desired to provide, for example a lowpass filter, with a cutoff frequency of some tens of hertz, for example 20 Hz. For instance, the capacitance of the capacitor $C_o$ is chosen in the range between 5 pF and 5 nF.

For instance, the resistance of the resistor $R_o$ is chosen in the range between 500 M$\Omega$ and 50 G$\Omega$. The values of capacitance of the capacitor $C_o$ and resistance of the resistor $R_o$ may likewise be chosen as a function of the impedance of the stage to which they are connected, of the useful frequency of the input voltage $V_d$ and of the frequency of the interferences to be filtered, for example the frequency of the power mains supply, the high-frequency electrical noises of the supply circuits, etc.

The instrumentation amplifier 160 includes two operational amplifiers OP1 and OP2. A biasing stage (buffer) OP3, comprising a resistor $R_{CM}$, is used for biasing the instrumentation amplifier 160 to a common-mode voltage $V_{CM}$.

The inverting terminals of the operational amplifiers OP1 and OP2 are connected together by a resistor $R_2$.

Since the two inputs of each operational amplifier OP1, OP2 must be at the same potential, the input voltage $V_d$ is applied also across the resistor $R_2$ and causes, through the resistor $R_2$, a current equal to $I_2=V_d/R_2$. The current $I_2$ does not come from the input terminals of the operational amplifiers OP1, OP2 and therefore passes through the two resistors $R_1$ connected between the outputs of the operational amplifiers OP1, OP2, in series to the resistor $R_2$; the current $I_2$ passing through the series of the three resistors $R_1$-$R_2$-$R_1$, thus produces an output voltage $V_d'$ given by $V_d'=I_2 \cdot (2R_1+R_2)=V_d \cdot (1+2R_1/R_2)$. Consequently, the overall gain of the circuit of FIG. 7 is Ad=$(1+2R_1/R_2)$. The differential gain depends upon the value of the resistor $R_2$ and can therefore be modified by acting on the resistor $R_2$.

The output voltage $V_d'$, which is thus proportional to the input voltage $V_d$ between the first and second inputs 165A, 165B, is supplied at input to an analog-to-digital converter 170, which supplies at output a charge-variation signal $S_Q$.

The charge-variation signal $S_Q$ is supplied to the external user recognition circuit 4, in particular to the first processing circuit 10, for subsequent processing, as described above in detail.

The charge-variation signal $S_Q$ can therefore be used by one or more analysis circuits 13 for determining one or more respective recognition parameters.

For instance, the charge-variation signal $S_Q$ can be used for identifying a specific activity of the external user, such as running, swimming, diving, etc.

For instance, the charge-variation signal $S_Q$ can be used as movement signal $I_1$ and/or as pressure signal $I_3$, in addition to or instead of signals generated by other sensors of the plurality of sensors 5. In other words, the charge-variation signal $S_Q$ can be used, for example, by the movement-analysis circuit 120 and/or by the touch-analysis circuit 130.

The analog-to-digital converter 170 is optional in so far as the first processing circuit 10 may be configured to work directly on the analog signal, or may itself comprise an analog-to-digital converter designed to convert the output signal $V_d'$.

It emerges from the foregoing that the charge-variation signal $S_Q$ associated with a specific movement of an external user of the portable electronic apparatus 1 can then be used for identifying and recognizing the way of walking, gesticulating, or other patterns of movement that are characteristic of the external user and therefore can be associated with an authorized or unauthorized user of the portable electronic apparatus 1, as discussed above in detail.

Finally, it is clear that modifications and variations may be made to the method of recognition of use of a portable electronic apparatus by an unauthorized user and to the corresponding portable electronic apparatus described and illustrated herein, without thereby departing from the scope of the present invention, as defined in the annexed claims.

For instance, the first, the second and the third processing circuits 10, 11, 12 may be formed by a single processing circuit, for example by the main processing circuit 2 or by a dedicated processing circuit, or by a number of dedicated processing circuits according to the requirements of a specific application.

For example, the analysis circuits 13, the respective parameter-extraction circuits 15 and/or the respective classification circuits 16 may be formed by respective dedicated processing circuits or be formed by just one processing circuit.

For instance, the memories 17, 18 and 19 of the first, the second and the third processing circuits 10, n, 12, respectively, may be each formed by a respective portion of the main memory 3 or by a dedicated memory.

For example, the time t' that elapses between the calculation of two successive overall discordance indicators O-DISCI may vary so as to increase in specific hours, for example at night, when the portable electronic apparatus is less used, and decrease in hours or parts of the day when the portable electronic apparatus is more used or in parts of the day detected as being more significant. For instance, it is possible to configure the external user recognition circuit for executing recurrent analysis of historical data, previously acquired and processed, and determining the aforesaid more significant parts of the day.

In addition, the plurality of sensors 5 may be configured to detect also further data regarding the use of the portable electronic apparatus 1, starting from which the user recognition circuit 4 can determine further recognition parameters, additional to the ones described above. For instance, these further data may be relative to the connection of the portable electronic apparatus 1, for example relative to the Internet traffic, the name of networks and external devices to which the portable electronic apparatus 1 is connected in different periods of the day, the level of the data-connection signal, and the level of call signal, or the further data may be relative to the type of software installed, the time of use of a software application, the telephone numbers called, the frequency of use of messaging software, the time elapsed between the reception of messages and reading thereof or personalization of settings of the portable electronic apparatus 1, such as volume at which to listen to music, brightness of screen, etc.

For instance, the user-recognition circuit 4 may be configured to carry out steps of periodic training, for example on a weekly basis, of the known machine-learning algorithms used by the first, second, and third processing circuits 10, 11, 12. In the above steps of periodic training, the values of the data previously detected by the sensors 5, and consequently the values of the respective signal-description parameters and of the respective recognition parameters, are used as labelled examples indicating the use of the portable electronic apparatus 1 by the authorized user. In this way, there is an improvement in the capacity of the external user recognition circuit 4 to identify an intrusion of an unauthorized user, which instead entails a sudden change of the mode of use of the portable electronic apparatus 1.

What is claimed is:

1. A method of recognition of an authorized user from an unauthorized user of a portable electronic apparatus, the method comprising:
    training a user-recognition circuit in the portable electronic apparatus, after a first start-up of the portable electronic apparatus by the authorized user, the training the user-recognition circuit comprising:
        prompting the authorized user to interact with the portable electronic apparatus by conducting pressure tests, performing user activity movement tests, and answering questions about device usage comprising habits of displacement or transportation type,
        obtaining information of use of the portable electronic apparatus by the authorized user, at least a portion of the information of use based on the authorized user interacting with the portable electronic apparatus in response to the prompting,
        converting the information of use to training data comprising expected values of sets of signal-description parameters, and
        performing a supervised training of the user-recognition circuit using the training data as labelled data belonging to respective concordance classes of the authorized user;
    performing a verification check at pre-set instants, pre-set situations, or a combination thereof, wherein the pre-set instants correspond to pre-set time intervals to trigger the verification check, and wherein the pre-set situation corresponds to pre-set situations that trigger the verification check, wherein the performing the verification check comprises:
        receiving, at the user-recognition circuit, a plurality of electrical signals from a plurality of sensors in the portable electronic apparatus, the plurality of sensors each configured to generate a signal representative of a respective physical quantity associated with a use of the portable electronic apparatus in an operating state,
        determining, at the user-recognition circuit, a plurality of recognition parameters from the plurality of electrical signals, each recognition parameter associated with a specific mode of use of the portable electronic apparatus by an external user,
        determining a plurality of indicators of use at the user-recognition circuit, one of the indicators of use determined for each of the recognition parameters, each of the indicators of use indicating a probability that, at a time instant, the respective recognition parameter is associable with the unauthorized user or the authorized user,
        determining, at the user-recognition circuit, a probability of intrusion starting from the plurality of indicators of use, and
        comparing, at the user-recognition circuit, the probability of intrusion with an intrusion threshold and based thereon recognizing the authorized user from the unauthorized user of the portable electronic apparatus; and
    configuring the portable electronic apparatus into a permanently blocking state in response to determining an unauthorized user during the verification check.

2. The method according to claim 1, wherein the determining the plurality of recognition parameters comprises determining a plurality of sets of signal-description parameters, one for each recognition parameter, each set of signal-description parameters comprising statistical parameters calculated starting from a respective portion of the plurality of electrical signals.

3. The method according to claim 2, wherein each set of the signal-description parameters comprises one or more of the following statistical parameters calculated starting from the respective portion of the plurality of electrical signals:

auto-correlation, mean, variance, peak-to-peak value, number of peaks, number and position of local maxima and minima and of inflection points, and number of zero-crossings.

4. The method according to claim 2, wherein the determining the plurality of indicators of use comprises:
classifying, using a classification algorithm, the recognition parameters, each in a respective discordance class or in a respective concordance class, each recognition parameter classified based on a comparison between current values of the respective set of signal-description parameters and previous values of the respective set of signal-description parameters, the respective concordance class comprising values of the respective set of signal-description parameters that are associable with the authorized user, the respective discordance class comprising values of the respective set of signal-description parameters that are associable with the unauthorized user; and
determining a plurality of specific discordance indicators, one for each recognition parameter, the specific discordance indicators each indicating the probability, at the time instant, that the respective recognition parameter belongs to the respective discordance class.

5. The method according to claim 4, wherein the classification algorithm includes a clustering algorithm, a decision tree, an artificial neural network, a support-vector machine, a K-means algorithm, or a combination thereof.

6. The method according to claim 4, further comprising updating the user-recognition circuit, the updating the user-recognition circuit comprising:
obtaining further information of use of the portable electronic apparatus by the authorized user;
converting the further information of use to further training data comprising further expected values of the sets of signal-description parameters; and
performing a further supervised training of the user-recognition circuit using the further training data as further labelled data belonging to the respective concordance classes.

7. The method according to claim 4, the determining the probability of intrusion starting from the plurality of indicators of use comprising:
determining an overall discordance indicator, starting from the values of the plurality of specific discordance indicators at the time instant, the overall discordance indicator indicating the probability that, at the time instant, the external user is associable with the unauthorized user, and
determining an overall discordance indicator over time, starting from values of the overall discordance indicator calculated in a decision time interval; and
the comparing the probability of intrusion with the intrusion threshold comprising verifying whether the overall discordance indicator over time is higher than the intrusion threshold.

8. The method according to claim 7, wherein the determining the overall discordance indicator at the time instant comprises executing a weighted mean of the plurality of specific discordance indicators.

9. The method according to claim 7, wherein the determining the overall discordance indicator at the time instant comprises using an artificial neural network for scheme recognition having at input the plurality of specific discordance indicators.

10. The method according to claim 7, wherein, in the decision time interval, the overall discordance indicators at the time instants are calculated with variable frequency.

11. The method according to claim 1, further comprising switching, by the portable electronic apparatus, from the permanently blocking state to the operating state upon a reset operation performed by a special authorized user.

12. The method according to claim 1, further comprising, by each of a plurality of analysis circuits, one for each recognition parameter, in the user-recognition circuit:
receiving a respective portion of the plurality of electrical signals;
determining the respective recognition parameter; and
determining the respective indicator of use.

13. The method according to claim 12, wherein the plurality of sensors comprises a movement sensor, an acoustic sensor, and a pressure sensor, the plurality of analysis circuits comprises a movement-analysis circuit associated with a movement-recognition parameter, a background-noise-analysis circuit associated with a background-noise-recognition parameter, and a touch-analysis circuit associated with a touch-recognition parameter, and the method comprises:
detecting, by the movement sensor, a movement of the portable electronic apparatus;
generating, by the movement sensor, a corresponding movement signal;
detecting, by the acoustic sensor, a sound surrounding the portable electronic apparatus;
generating, by the acoustic sensor, a corresponding acoustic signal;
detecting, by the pressure sensor, a pressure of touch of the portable electronic apparatus;
generating, by the pressure sensor, a corresponding pressure signal;
receiving and processing, by the movement-analysis circuit, the corresponding movement signal;
receiving and processing, by the background-noise-analysis circuit, the corresponding acoustic signal; and
receiving and processing, by the touch-analysis circuit, the corresponding pressure signal.

14. The method according to claim 1, further comprising:
detecting, by an electrostatic-charge-variation sensor of the plurality of sensors, a variation of electrostatic charge from a movement of the external user of the portable electronic apparatus; and
generating, by the electrostatic-charge-variation sensor, a corresponding charge-variation signal.

15. A portable electronic apparatus configured to recognize an authorized user from an unauthorized user, the portable electronic apparatus comprising:
a plurality of sensors, each sensor configured to generate an electrical signal representative of a respective physical quantity associated with a use of the portable electronic apparatus in an operating state; and
a user-recognition circuit configured to:
train the user-recognition circuit, after a first start-up of the portable electronic apparatus by the authorized user, comprising the user-recognition circuit configured to:
prompt the authorized user to interact with the portable electronic apparatus by conducting pressure tests, performing user activity movement tests, and answering questions about device usage comprising habits of displacement or means of transport, obtain information of use of the portable electronic apparatus by the authorized user, at least a portion of the information of use based on the authorized user interacting with the portable electronic apparatus in response to the prompting, convert the information of use to training data comprising expected values of sets of signal-description parameters, and perform a supervised training of the user-recognition circuit using the training data as labelled data belonging to respective concordance classes of the authorized user;

perform a verification check at pre-set situations, wherein the pre-set situation corresponds to pre-set situations that trigger the verification check, wherein the performing the verification check comprises:

receive the plurality of electrical signals from the plurality of sensors, determine a plurality of recognition parameters from the plurality of electrical signals, each recognition parameter associated with a specific mode of use of the portable electronic apparatus by an external user, determine a plurality of indicators of use at the user-recognition circuit, one of the indicators of use determined for each of the recognition parameters, each of the indicators of use indicating a probability that, at a time instant, the respective recognition parameter is associable with the unauthorized user or the authorized user, determine a probability of intrusion starting from the plurality of indicators of use, and compare the probability of intrusion with an intrusion threshold and based thereon recognize the authorized user from the unauthorized user of the portable electronic apparatus; and configuring the portable electronic apparatus into a permanently blocking state in response to determining an unauthorized user during the verification check.

16. The portable electronic apparatus according to claim 15, wherein the user-recognition circuit configured to determine the plurality of recognition parameters comprises the user-recognition circuit configured to determine a plurality of sets of signal-description parameters, one for each recognition parameter, each set of signal-description parameters comprising statistical parameters calculated based on a respective portion of the plurality of electrical signals;

wherein the user-recognition circuit configured to determine the plurality of indicators of use comprises the user-recognition circuit configured to classify, using a classification algorithm, the recognition parameters, each in a respective discordance class or in a respective concordance class, each recognition parameter classified based on a comparison between current values of the respective set of signal-description parameters and previous values of the respective set of signal-description parameters, the respective concordance class comprising values of the respective set of signal-description parameters that are associable with the authorized user, the respective discordance class comprising values of the respective set of signal-description parameters that are associable with the unauthorized user; and the user-recognition circuit configured to determine a plurality of specific discordance indicators, one for each recognition parameter, the specific discordance indicators each indicating a probability, at the time instant, that the respective recognition parameter belongs to the respective discordance class.

17. The portable electronic apparatus according to claim 15, wherein the user-recognition circuit comprises a plurality of analysis circuits, one for each recognition parameter, the analysis circuits each configured to receive a respective portion of the plurality of electrical signals, determine the respective recognition parameter, and determine the respective indicator of use.

18. The portable electronic apparatus according to claim 17, wherein the plurality of sensors comprises a movement sensor, an acoustic sensor, and a pressure sensor, the movement sensor configured to detect a movement of the portable electronic apparatus and generate a corresponding movement signal, the acoustic sensor configured to detect a sound surrounding the portable electronic apparatus and generate a corresponding acoustic signal, and the pressure sensor configured to detect a pressure of touch of the portable electronic apparatus and generate a corresponding pressure signal; and wherein the plurality of analysis circuits comprises a movement-analysis circuit, a background-noise-analysis circuit, and a touch-analysis circuit, the movement-analysis circuit associated with a movement-recognition parameter and configured to receive and process the corresponding movement signal, the background-noise-analysis circuit associated with a background-noise-recognition parameter and configured to receive and process the corresponding acoustic signal, and the touch-analysis circuit associated with a touch-recognition parameter and configured to receive and process the corresponding pressure signal.

19. An apparatus for recognition of an authorized user from an unauthorized user, comprising:

a plurality of sensors, each sensor configured to generate an electrical signal representative of a respective physical quantity associated with a use of the apparatus in an operating state; and a processing circuit; and a non-transitory memory comprising instructions, wherein the instructions, when executed by the processing circuit, cause the processing circuit to:

perform a training operation, wherein performing the training operation comprises:

prompt the authorized user to interact with the apparatus by conducting pressure tests, performing user activity movement tests, and answering questions about device usage comprising habits of displacement or means of transport, obtain information of use of the portable electronic apparatus by the authorized user, at least a portion of the information of use based on the authorized user interacting with the apparatus in response to the prompting, convert the information of use to training data comprising expected values of sets of signal-description parameters, and perform a supervised training of the user-recognition circuit using the training data as labelled data belonging to respective concordance classes of the authorized user;

perform a verification check at pre-set situations, wherein the pre-set situation corresponds to pre-set situations that trigger the verification check, wherein the performing the verification check comprises:

receive the plurality of electrical signals from the plurality of sensors, determine a plurality of recognition parameters from the plurality of electrical signals, each recognition parameter associated with a specific mode of use of the apparatus by an external user, determine a plurality of indicators of use, one of the indicators of use determined for each of the recognition parameters, each of the indicators of use indicating a probability that, at a time instant, the respective recognition parameter is associable with the unauthorized user or the authorized user, determine a probability of intrusion starting from the plurality of indicators of use, and compare the probability of intrusion with an intrusion threshold and based thereon recognize the authorized user from the unauthorized user of the portable electronic apparatus; and configuring the apparatus into a permanently blocking state in response to determining an unauthorized user during the verification check.

20. The apparatus of claim 19, wherein the instructions cause the processing circuit to switch from the permanently blocking state to the operating state upon a reset operation performed by a special authorized user.

\* \* \* \* \*